United States Patent [19]
Murawa et al.

[11] Patent Number: 5,582,452
[45] Date of Patent: Dec. 10, 1996

[54] MEMBER FOR RUBBER-SPRUNG RAIL WHEELS AND RUBBER-SPRUNG RAIL WHEEL

[75] Inventors: Franz Murawa, Bochum; Wilfried Bittner, Hattingen; Jürgen Schneider, Bochum; Volker Fischer, Minden, all of Germany

[73] Assignee: Vereinigte Schmiedewerke GmbH, Bochum, Germany

[21] Appl. No.: 359,471

[22] Filed: Dec. 15, 1994

[30]    Foreign Application Priority Data

Dec. 16, 1993 [DE] Germany .......................... 43 42 906.8

[51] Int. Cl.⁶ ........................................................ B60B 5/02
[52] U.S. Cl. ............................................... 295/11; 191/61
[58] Field of Search ............................ 191/45 R, 61, 191/63; 295/7, 11, 30, 35; 105/224.1, 392.5, 452

[56]              References Cited

U.S. PATENT DOCUMENTS

| | | | |
|---|---|---|---|
| 623,883 | 4/1899 | Cameron | 295/11 |
| 1,790,516 | 1/1931 | Williams | 295/11 X |
| 2,086,720 | 7/1937 | Malmquist | 295/11 |
| 2,954,259 | 9/1960 | Kordes | 295/11 |
| 3,934,921 | 1/1976 | Nelken | 295/7 X |
| 4,212,491 | 7/1980 | Pinckney | 295/11 |

FOREIGN PATENT DOCUMENTS

| | | |
|---|---|---|
| 542573 | 11/1955 | Belgium . |
| 553372 | 12/1956 | Belgium . |
| 1103051 | 10/1955 | France ............................. 295/7 |
| 2246580 | 1/1974 | Germany . |
| 2324060B2 | 3/1975 | Germany . |
| 3328321 | 2/1985 | Germany . |

*Primary Examiner*—Karen B. Merritt
*Assistant Examiner*—Scott L. Lowe
*Attorney, Agent, or Firm*—Standley & Gilcrest

[57]                ABSTRACT

A rubber member for rubber-elastic rail wheels which in the expanded state has an oval opening for receiving a flexible current bridge. When the rubber member is incorporated in the rail wheel, the opening assumes a substantially circular cross-section under prestressing.

11 Claims, 2 Drawing Sheets

MEMBER FOR RUBBER-SPRUNG RAIL WHEELS AND RUBBER-SPRUNG RAIL WHEEL

BACKGROUND AND SUMMARY OF THE INVENTION

The present invention relates to a rubber member for rubber-sprung rail wheels in which the rubber member is disposed under prestressing in an annular gap between concentric wheel parts. The rubber member has an opening provided between its opposite faces bearing against the wheel parts and a flexible current bridge being disposed in the opening.

The present invention also relates to a rubber-sprung rail wheel using such a rubber member.

In a prior an rubber-sprung rail wheel, peripherally distributed radially prestressed rubber members are disposed in an annular gap formed by a wheel rim and a wheel tire of the rail wheel. When the rubber member is expanded or unstressed, the opening therein has a circular cross-section which in practice is only slightly larger than the diameter of the flexible current bridges. The circular cross-sections are deformed to oval under the radial prestressing of the rubber members. As a result, the free spaces for movement of the flexible current bridge are limited during retraction and expansion, more particularly having regard to the imprecision of its position, and this may lead to breakages and to a reduction in the effectiveness of the current bridge. In modern high-speed trains, in which the rubber members are subjected to an increased change of load up to 25 load modulations per second, this leads to a reduction in the required service life of approximately $5 \times 10^8$ load modulations. In the case of tramcars, with a smaller number of load modulations, comfort is adversely affected with respect to a required high springing deflection member.

It is an object of the invention to improve the durability of a rubber member having a current bridge and also to improve the service life of a rubber-sprung rail wheel having a rubber member having a current bridge.

This problem is solved by a rubber member that has an opening with an oval cross-section in the flexible zone of the current bridge when the rubber member is in its expanded or unstressed state. The problem is also solved by a rail wheel using such a rubber member where the annular gap is formed by concentric parts, namely a wheel rim of the wheel body and a wheel tire. The rail wheel may have a plurality of peripherally distributed radially prestressed rubber members disposed in the annual gap, of which at least one has the current bridge.

According to the present invention the oval cross-section of the opening may be deformed to a circular shape, thus creating an optimum space for current bridge movement during expansion and retraction. The result is an increase in the service life of the rubber member having a current bridge and, therefore, also the service life of the wheel rail equipped with such a rubber member. If a rubber member should have a number of openings furnished with current bridges, preferably all the openings should have an oval shape when in the expanded or unstressed shape.

According to one feature of the present invention, preferably the oval cross-section is elliptical. Preferably the ratio between the maximum diameter of the oval cross-section and the minimum diameter is 1.25–1.35/1.

In one embodiment, the opening for the current bridge has at each of its ends a widened portion in which a contact shoe that is connected to the current bridge may be disposed. The widened portion preferably has an oval cross-section and is offset by 90 degrees in relation to the axis of the oval cross-section of the opening. Preferably the minimum diameter of the widened portion is 0 to 20% larger than the maximum diameter of the central zone of the opening.

Other principal features and advantages of the invention will become apparent to those skilled in the art upon review of the following detailed description, claims and drawings.

DETAILED DESCRIPTION OF THE PREFERRED EMBODIMENTS

Figure 1:
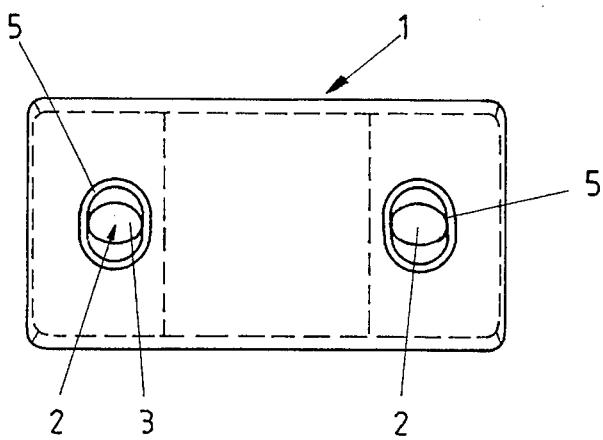
FIG. 1 is a plan view of a rubber member having two openings and a current bridge.
Figure 2:
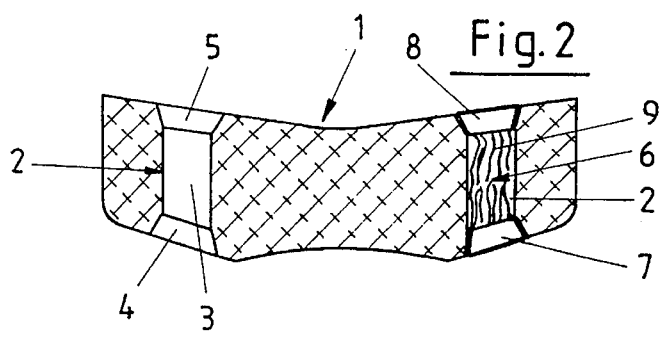
FIG. 2 is an axial cross-section of the rubber member shown in FIG. 1.
Figure 3:
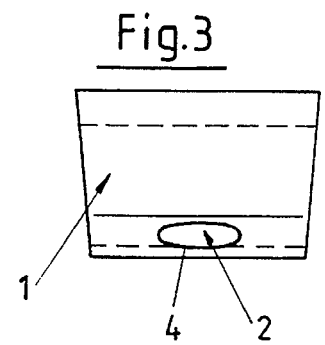
FIG. 3 is a side elevation or the rubber member shown in FIG. 1.

Referring now to FIGS. 1 to 3, a rubber member 1, as shown in FIG. 2, has a slight V-shape and is constructed slightly in the shape of a wedge, as shown in FIG. 3. In the drawings the rubber member is shown in the expanded or unstressed state.

The rubber member 1 has between opposite outer bearing faces two symmetrically disposed openings 2 which have an oval shape in zone 3 of their minimum cross-section. Zone 3 extends practically over the entire height of the rubber member 1 and terminates in a lower widened portion 4 and an upper widened portion 5 in the rubber member 1.

Figure 4:
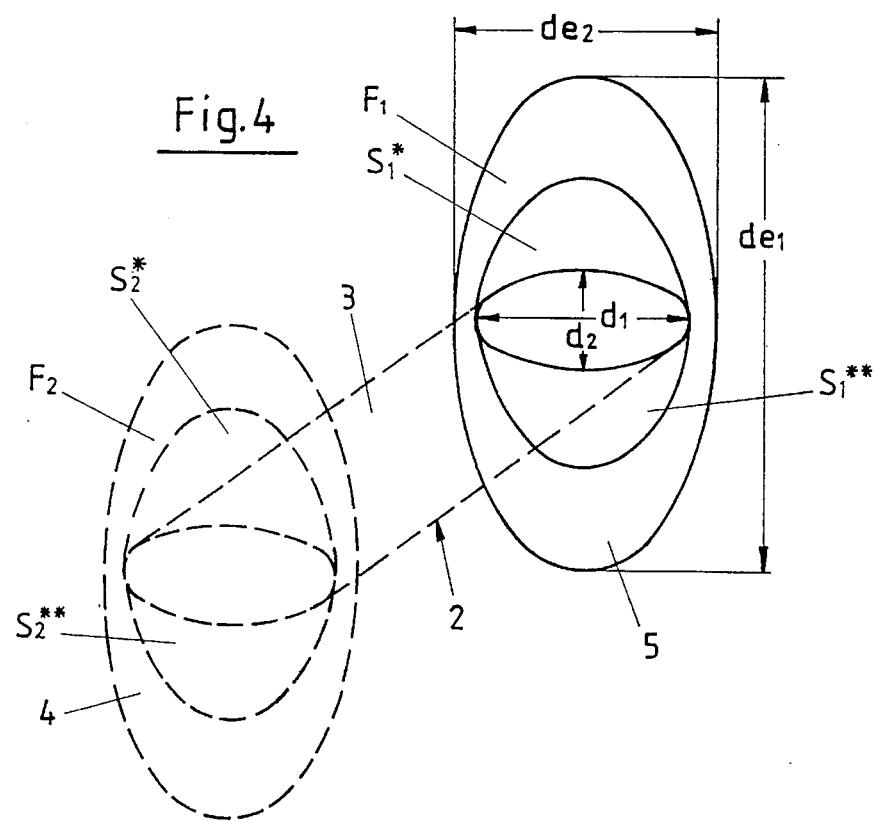
FIG. 4 is an abstract perspective illustration of the opening of the rubber member shown in FIG. 1.

As shown in perspective in FIG. 4, zone 3 of opening 2 that has the minimum cross-section has a major diameter d1 in one axis (in the incorporated state parallel with the wheel axle) and a minor diameter d2 in the other axis. Preferably each axis is offset in relation to the other by 90 degrees. Overall widened portions 4 and 5 have a minor diameter de2 that is preferably larger than the major diameter d1 of the opening 2. These diameters are preferably offset by 90 degrees in relation to the respective major and minor axes of the central zone 3 of oval opening 2. Preferably the major diameter de1 is larger than the minor diameter de2. At the edge the widened portions 4 and 5 may have sloping flanks F1 and F2 and internal flat supporting faces S1*, S1**, S2* and S2**.

Incorporated in the right-hand opening 2 (FIG. 2) is a current bridge 6 consisting of a lower contact shoe 7 and an upper contact shoe 8 and also a bendably resilient current conductor 9 connected thereto. The contact shoes 7 and 8 are disposed in the widened portions 4 and 5, while the bendably resilient current conductor 9 extends through the central zone 3 of the opening 2. The rubber-sprung rail wheel 10 (FIG. 5) with its wheel axle 19 may consist of a wheel body 12 having a wheel hub 11 and a wheel tire 18 retained on the wheel body by prestressed rubber members. The section accurately shows the special rubber member 1 of FIGS. 1 to 4.

The wheel 12 may have a rim 13 constructed integrally with the wheel 12 and a loose ring-shaped rim 14 disposed thereon with a force fit. Screw bolts 15 may also be provided which may be uniformly distributed peripherally in gaps between the rubber members 1 and whose heads 16 bear against a shoulder of the rim 13 and whose nuts 17 bear against a shoulder of the annular rim 14, thus additionally securing the rim 14 applied with a press fit.

Figure 5:
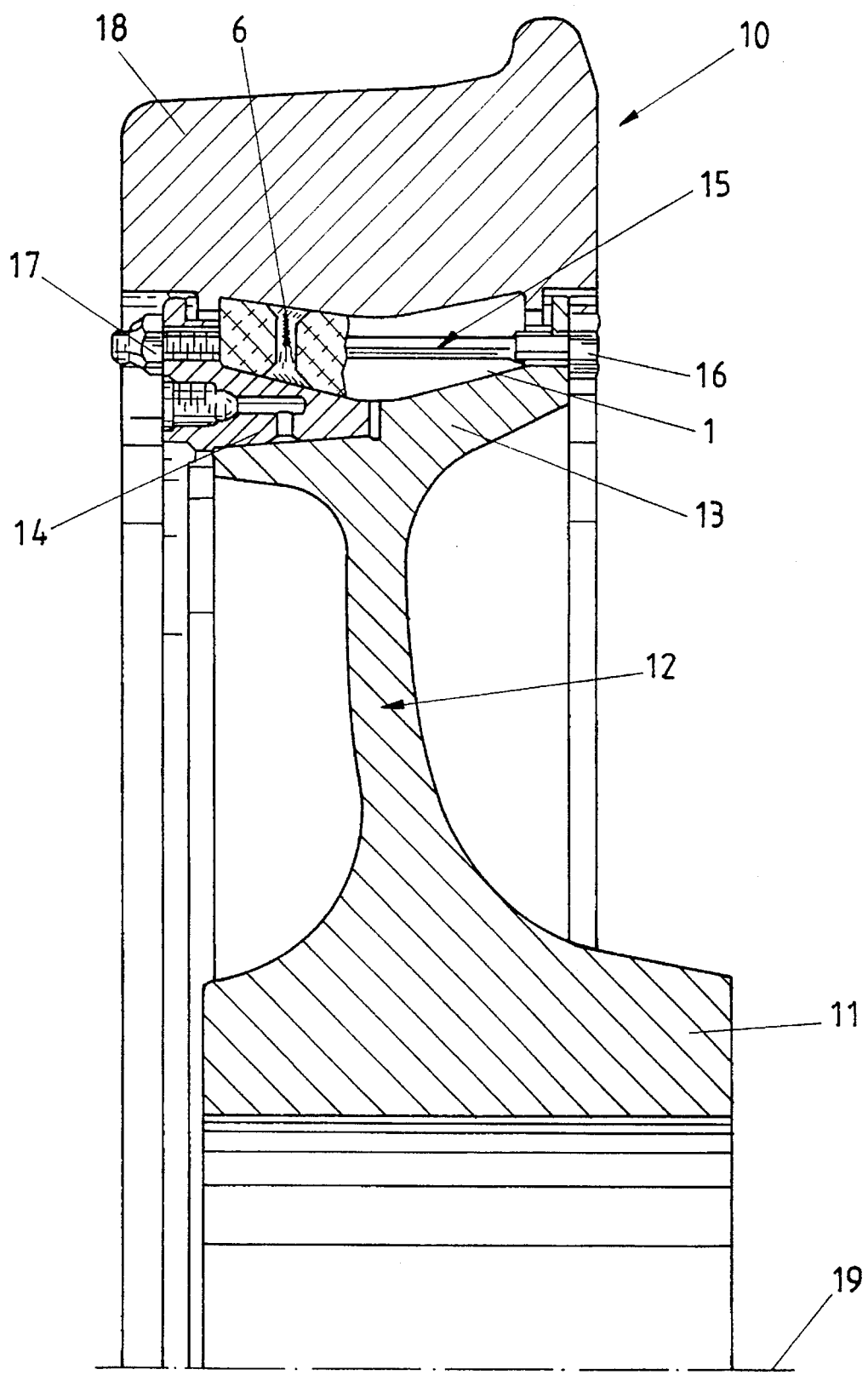
FIG. 5 is an axial haft section of a rail wheel with an incorporated rubber member as shown in FIG. 1.

Just like other rubber members, the special rubber member of the present invention bears under prestressing on the wheel body side against the rims 13 and 14 and against the wheel 18. The sectioned part of the rubber member of the present invention demonstrated in FIG. 5 shows how the current bridge 6 with its contact shoes 7 and 8 is pressed under the prestressing in the rubber members against the rims 13 and 14 of the wheel body 12 and against the wheel tire 18.

In the rubber-sprung rail wheel 10 (FIG. 5) the rubber members and therefore also the rubber member 1 comprising the current bridge 6 are prestressed. Due to the prestressing, the cross-section of the opening 2, which is oval in the central zone 3 when the rubber member is unstressed, has been deformed in the direction of a circular shape, so that enough free space for movement is available during expansion and retraction for the current bridge 6 with its flexible part 9 accommodated in the opening 2.

What is claimed is:

1. A flexible member for rubber-sprung rail wheels with first and second concentric parts and with an annular gap between them, comprising:

a rubber member adapted to fit in said annular gap;

a current bridge; and an opening through said rubber member, wherein said opening is adapted to receive said current bridge, wherein said opening has an oval cross-section when said rubber member is in an unstressed state.

2. The rubber member of claim 1, wherein said oval cross-section is elliptical.

3. The rubber member of claim 1, wherein the ratio between the maximum diameter of the oval cross-section and the minimum diameter of the oval cross-section is 1.25/1 to 1.35/1.

4. The rubber member of claim 1, wherein said opening has at each end a widened portion adapted to receive a contact shoe of said current bridge.

5. The rubber member of claim 4, wherein each said widened portion has an oval cross-section and wherein each said oval cross-section is axially offset by 90 degrees from the oval cross-section of said opening, wherein the minimum diameter of said widened portion is from zero to twenty percent larger than the maximum diameter of the opening.

6. A rubber-sprung rail wheel, comprising:

a wheel rim;

a wheel tire disposed concentrically outside of said wheel rim;

at least one rubber member disposed in an annular gap between said wheel rim and said wheel tire, wherein said rubber member has an opening through said rubber member, wherein said opening is adapted to receive a current bridge, wherein said opening has an oval cross-section when said rubber member is in an unstressed state; and a current bridge residing in said opening.

7. The rubber-sprung rail wheel of claim 6, wherein said oval cross-section is elliptical.

8. The rubber-sprung rail wheel of claim 6, wherein the ratio between the maximum diameter of the oval cross-section and the minimum diameter of the oval cross-section is 1.25/1 to 1.35/1.

9. The rubber-sprung rail wheel of claim 6, wherein said opening has at each end a widened portion adapted to receive a contact shoe of said current bridge.

10. The rubber-sprung rail wheel of claim 9, wherein each said widened portion has an oval cross-section and wherein each said oval cross-section is axially offset by 90 degrees from the oval cross-section of said opening, wherein the minimum diameter of said widened portion is from zero to twenty percent larger than the maximum diameter of the opening.

11. A rubber member for rubber-sprung rail wheels with first and second concentric wheel parts and with an annular gap between them, comprising:

a rubber member disposed under prestressing in said annular gap between said first and second concentric wheel parts, said robber member having opposite outer bearing faces;

a current bridge; and an opening provided between said outer bearing faces bearing against said wheel parts and said current bridge disposed in said opening;

wherein said opening has an oval cross-section when said rubber member is in an unstressed state.

\* \* \* \* \*

UNITED STATES PATENT AND TRADEMARK OFFICE
CERTIFICATE OF CORRECTION

PATENT NO. : 5,582,452
DATED : December 10, 1996
INVENTOR(S) : Franz Murawa, Wilfried Bittner, Jürgen Schneider and Volker Fischer It is certified that error appears in the above-indentified patent and that said Letters Patent is hereby corrected as shown below:

In column 1, line 17, please delete the word "an" and replace it with -- art --.

Signed and Sealed this

Fifteenth Day of April, 1997

Attest:

BRUCE LEHMAN

Attesting Officer

Commissioner of Patents and Trademarks